US011518099B2

(12) United States Patent
Vaes et al.

(10) Patent No.: US 11,518,099 B2
(45) Date of Patent: Dec. 6, 2022

(54) APPARATUS AND METHOD FOR PRODUCING AN OBJECT BY MEANS OF ADDITIVE MANUFACTURING

(71) Applicant: ADDITIVE INDUSTRIES B.V., Eindhoven (NL)

(72) Inventors: Mark Herman Else Vaes, Eindhoven (NL); Steef Willem Denteneer, Eindhoven (NL); Erwin Wijn, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 40 days.

(21) Appl. No.: 16/753,180

(22) PCT Filed: Nov. 26, 2018

(86) PCT No.: PCT/NL2018/050790
§ 371 (c)(1),
(2) Date: Apr. 2, 2020

(87) PCT Pub. No.: WO2019/108058
PCT Pub. Date: Jun. 6, 2019

(65) Prior Publication Data
US 2020/0316863 A1 Oct. 8, 2020

(30) Foreign Application Priority Data
Nov. 30, 2017 (NL) ...................................... 2019998

(51) Int. Cl.
B29C 67/00 (2017.01)
B29C 64/268 (2017.01)
(Continued)

(52) U.S. Cl.
CPC .......... B29C 64/268 (2017.08); B29C 64/153 (2017.08); B29C 64/393 (2017.08);
(Continued)

(58) Field of Classification Search
CPC ... B29C 64/153; B29C 64/268; B29C 64/393; B33Y 10/00; B33Y 30/00; B33Y 50/02
See application file for complete search history.

(56) References Cited

U.S. PATENT DOCUMENTS

2009/0184444 A1* 7/2009 Honda ................... B33Y 40/00
264/401
2016/0175935 A1* 6/2016 Ladewig .................. B22F 7/02
425/78
(Continued)

FOREIGN PATENT DOCUMENTS

EP 3 202 525 A1 8/2017
JP 2009113293 A 5/2009
(Continued)

OTHER PUBLICATIONS

International Search Report for International Application No. PCT/NL2018/050790 dated Feb. 21, 2019.

Primary Examiner — Ryan M Ochylski
(74) Attorney, Agent, or Firm — Suiter Swantz pc llo

(57) ABSTRACT

The invention relates to an apparatus for producing an object by means of additive manufacturing, comprising a process chamber for receiving a bath of material which can be solidified by exposure to electromagnetic radiation; a support for positioning the object in relation to the surface level of the bath of material; and a solidifying device for solidifying a selective layer-part of the material on the surface level by means of electromagnetic radiation. Furthermore optical control device is provided with a focus unit in an optical pathway of the electromagnetic radiation of the solidifying device, and arranged for controlling at least the focus of the electromagnetic radiation emitted by the solidifying device on the surface level. According to the invention, the optical control device comprises a sensor element arranged for detecting a measure for the accuracy of the (Continued)

focus of the electromagnetic radiation and a focus correction lens element that is arranged to be movable. By moving said focus correction lens element, focus may be corrected, for example due to thermal behaviour of the optical system.

11 Claims, 4 Drawing Sheets

(51) Int. Cl.
    *B33Y 10/00*     (2015.01)
    *B33Y 30/00*     (2015.01)
    *B33Y 50/02*     (2015.01)
    *B29C 64/153*     (2017.01)
    *B29C 64/393*     (2017.01)

(52) U.S. Cl.
    CPC ............... *B33Y 10/00* (2014.12); *B33Y 30/00* (2014.12); *B33Y 50/02* (2014.12)

(56) References Cited

U.S. PATENT DOCUMENTS

2016/0236279 A1*   8/2016   Ashton .................. B22F 12/44
2018/0186082 A1*   7/2018   Randhawa ........... B23K 26/062

FOREIGN PATENT DOCUMENTS

JP          2016540109 A     12/2016
WO        2017/051168 A1    3/2017

\* cited by examiner

APPARATUS AND METHOD FOR PRODUCING AN OBJECT BY MEANS OF ADDITIVE MANUFACTURING

TECHNICAL FIELD AND BACKGROUND

The invention relates to an apparatus for producing an object by means of additive manufacturing, comprising a process chamber for receiving a bath of material which can be solidified by exposure to electromagnetic radiation; a support for positioning the object in relation to the surface level of the bath of material; and a solidifying device for solidifying a layer of the material on the surface level by means of electromagnetic radiation.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is how to accurately and reproducibly solidify selective parts of the layer.

BRIEF SUMMARY

To this end, the invention provides an apparatus for producing an object by means of additive manufacturing, comprising a process chamber for receiving a bath of material which can be solidified by exposure to electromagnetic radiation; a support for positioning the object in relation to the surface level of the bath of material; and a solidifying device for solidifying a selective layer-part of the material on the surface level by means of electromagnetic radiation.

Additionally, the apparatus according to the invention comprises an optical control device with a focus unit provided in an optical pathway of the electromagnetic radiation of the solidifying device, and arranged for controlling at least the focus of the electromagnetic radiation emitted by the solidifying device on the surface level. Said focus unit may comprise one or more lens elements, or one or more lens objectives, and is arranged for controlling the focus of the electromagnetic radiation on a focal plane (i.e. the surface level of the bath of material).

According to the invention the optical control device comprises a sensor element arranged for detecting a measure for the accuracy of the focus of the electromagnetic radiation. The sensor element preferably is an inline focus sensor, meaning that it is arranged to be in contact with the electromagnetic radiation.

Furthermore, a focus correction lens element is provided in the optical pathway of the electromagnetic radiation. This focus correction lens element is preferably an individual element, meaning that it is arranged separately from the focus unit, in particular downstream or upstream of the focus unit. The focus correction lens element is arranged to be movable in the direction of at least an optical axis thereof. Hence, the overall focus of the electromagnetic radiation on the focal plane may be changed or adjusted by moving the focus correction lens element. The focus correction lens element may be a single lens element, or may be part of a more complex objective lens.

Additionally, the apparatus according to the invention comprises a focus correction control unit, connected to said sensor element and to said focus correction element, and arranged for moving said focus correction lens element in response to a signal obtained by said sensor element.

With the apparatus according to the invention, it is possible to provide, in an easy and effective manner, for active compensation of focus drift due to thermo-mechanical and thermo-optical behaviour of optical components. It was found that heating up of optical elements by absorption of laser light can cause changes in focus characteristics. In particular, thermal expansion and change of refractive index with temperature are among the driving influences. These changes in focus, as a result of focus drift, causes variation in product quality. With the inline sensor element, coupled to a focus correction control unit, and the focus correction lens element it is possible to provide a correction for these changes in focus characteristics. With this, more accurate and reproducible production of solidified parts becomes possible. Thus, the object of the invention is achieved.

Further advantageous embodiments of the invention will be described below.

In an embodiment, the optical control device comprises a beamsplitter element provided in the optical pathway of the electromagnetic radiation, and arranged for providing a beam of transmitted light and a beam of reflected light, and wherein the sensor element is arranged downstream of the beamsplitter element. With this it is possible to measure the accuracy of the focus with respect to the beam of electromagnetic radiation itself. Hence, the influence of thermal behaviour of optical components, in particular upstream of the beamsplitter element located on the transmitted optical pathway, can be sensed. Measures may be taken, i.e. focus may be corrected, when deviations are measure by the sensor element.

In an embodiment, the sensor element is arranged to receive said beam of transmitted light. In that case, the reflected light is used as electromagnetic radiation for solidifying a part of the material on the surface level of the bath.

In an effective embodiment, the beamsplitter element is a plane surface beamsplitter with partially transmitting or dichroic surface coating. This is an effective and accurate way to obtain a beam of reflected light and a beam of transmitted light.

In an embodiment, the focus correction lens element is arranged upstream of the sensor element. This way, a direct feedback may be obtained: a deviation measured by the sensor element is used to adjust the focus correction lens element, and the resulting change in focus is once again measured by the sensor element.

In an alternative embodiment, the focus correction lens element is arranged downstream of the sensor element. This may provide for a very compact construction, but this also means that hardly any feedback is obtained with respect to changes in focus as a result of movement of the focus correction lens element. In this embodiment, however, it can be ascertained that any deviation or change measured in the sensor element is the result of thermal behaviour of the optical components upstream of the beamsplitter, and not the result, for example, of an inaccuracy of the focus correction lens element. Thus, this provides more reliable information with regards to the thermal situation of the apparatus.

In an embodiment, the focus correction lens is arranged in the optical path of the beam of reflected light. In particular, the focus correction lens is arranged in between said beamsplitter element and said focus unit. In other words, the focus correction lens is provided downstream of said beamsplitter element, and upstream of said focus unit.

To further increase the accuracy of focus of the apparatus, the focus correction control unit may be arranged for receiving system information and/or system data of said apparatus. Said system information and/or system data may comprise one or more parameters of one or more parts of the apparatus, for example the solidifying device and/or the build chamber or parts thereof. Said one or more parameters may comprise geometry information, a temperature, a power usage, an active time, and/or an idle time, for example. Other parameters are conceivable as well. In this embodiment, the focus correction control unit is arranged for moving said focus correction lens element in response to said system information and/or said system data of said apparatus.

In an embodiment, the focus correction lens element comprises a positive or negative lens, in particular a single positive or negative lens. This makes the overall construction relatively compact.

In an embodiment, the optical control device comprises a positive lens element arranged upstream of said sensor element. The lens element is arranged for focusing electromagnetic radiation (either originating from reflection or transmission, but preferably originating from transmission) onto the sensor element. The lens element is arranged in such a way that in a standard condition the electromagnetic radiation is substantially perfectly focused on the sensor element. The lens element is in particular a fixed, i.e. non-movable, lens element.

According to an aspect, the invention provides a method of correcting a focus of electromagnetic radiation on a surface level of a bath of material which can be solidified by exposure to said electromagnetic radiation, wherein said method comprises the steps of:
  providing a beam of electromagnetic radiation;
  focusing said beam of electromagnetic radiation on said surface level of the bath of material by using a focus unit provided in an optical path of the electromagnetic radiation;
  detecting a measure for the accuracy of the focus of the electromagnetic radiation; and
  moving a focus correction lens element in response to the detected measure for the accuracy of the focus of the electromagnetic radiation for correcting the focus.

The method may comprises the step of using an apparatus according to the invention, in particular as described above.

With the method, it is possible to provide active compensation of focus drift as a result of thermal behaviour of optical components in the apparatus. Further advantages of the method have already been discussed with respect to the apparatus.

BRIEF DESCRIPTION OF THE DRAWINGS

The invention will next be explained by means of the accompanying figures. In the figures.

DETAILED DESCRIPTION

Figure 1:
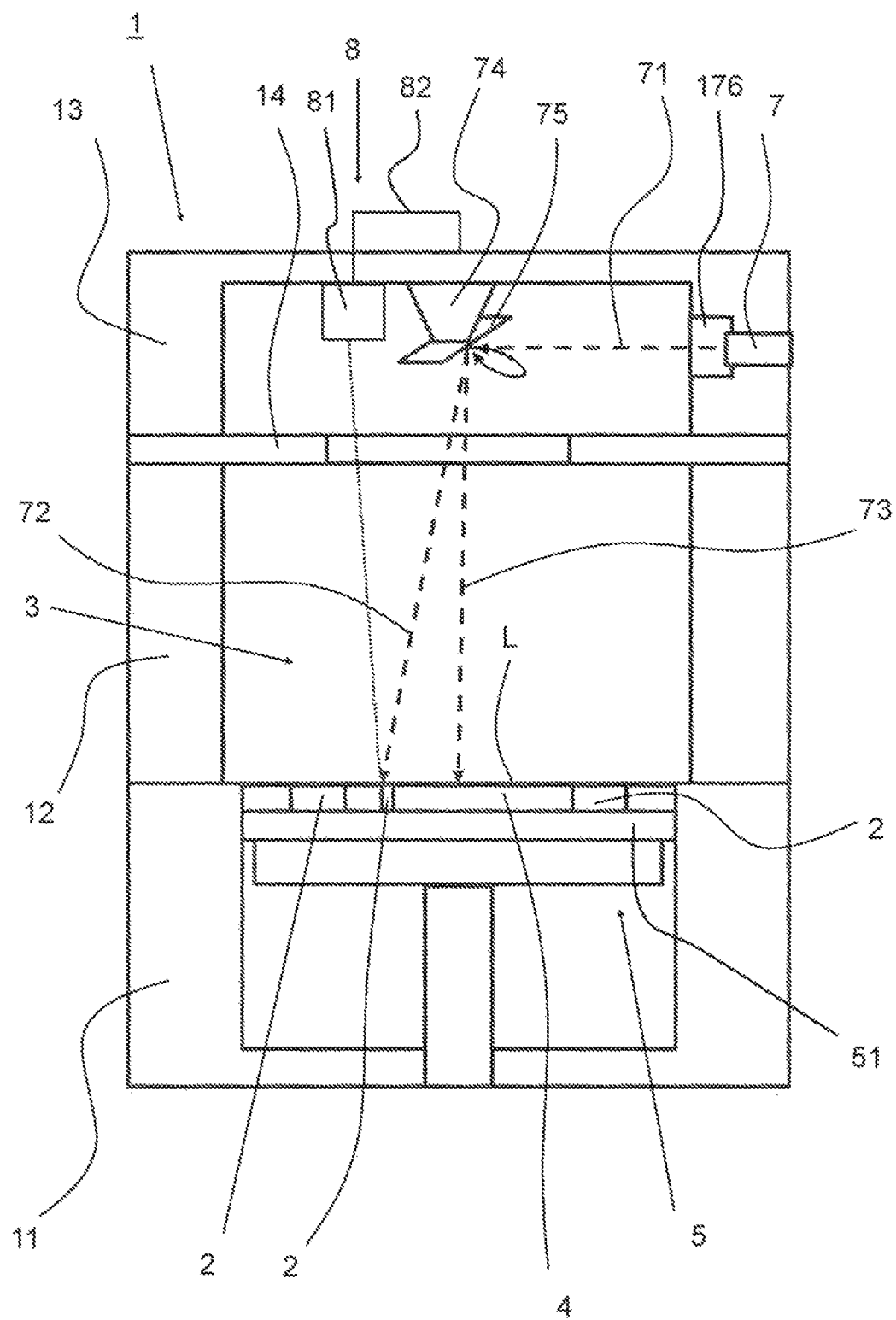
FIG. 1—shows a schematic overview of an apparatus according to the invention, arranged for producing an object by means of additive manufacturing.

FIG. 1 shows an overview of an apparatus 1 for producing an object 2 by means of additive manufacturing. The apparatus 1 is build from several frame parts 11, 12, 13. The apparatus comprises a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material. In the embodiment shown, the solidifying device 7 is a laser device, which is arranged for producing electromagnetic radiation in the form of laser light 71, in order to melt a powdered material provided on the support, which then, after cooling forms a solidified part of the object to be produced. However, the invention is not limited to the type of solidifying device. As can be seen, the electromagnetic radiation 71 emitted by the laser device 7 is deflected by means of a deflector unit 74, which uses a rotatable optical element 75, e.g. one or more galvo mirror elements 75, to direct the emitted radiation 71 towards the surface L of the layer of material 4. Depending on the position of the deflector unit 74, radiation may be emitted, as an example, according to rays 72, 73. The apparatus comprises an optical control device 176 with a focus unit provided in an optical pathway of the electromagnetic radiation of the solidifying device 7, and arranged for controlling at least the focus of the electromagnetic radiation emitted by the solidifying device on the surface level. The focus unit has at least one focus element 76 (see FIG. 2), which may be used to adjust the focus of the radiation, for example for adjusting for the increased distance covered by ray 72 compared to ray 73.

The apparatus 1 may further comprise a recoating device (not shown) which can be displaced along the surface L of the bath for levelling the surface L of the bath of material 4. Such a recoating device is known per se to those skilled in the art. With the method according to the invention, focus calibration is aimed at providing accurate focus on the surface L of the bath, since this is the surface level where the solidifying device needs to present accurate focus for solidifying material.

The apparatus 1 may comprise a calibration system 8 with a sensor unit 81. The sensor unit 81 is directed to the surface level L of the layer of material 4, or—in absence of material 4—towards the support 5. The calibration system 8 is connected to the apparatus 1 by means of line 82. With this, the calibration system may control the solidifying device, as will be explained below. The calibration system 8 may be a fixed part of the apparatus 1, or may be a more or less modular component that is connected to the apparatus 1 in case calibration of the apparatus is desired. The sensor unit 81 may comprise an imaging sensor for making an image of the surface level L of the layer of material, or any other material presented on the support (such as a calibration body), or of the support 5 itself. This imaging sensor may also be arranged in such a way that the optical path of the imaging sensor coincides with the optical path of the solidifying device, or is generally the same thereto. This is referred to as an on-axis imaging sensor.

Figure 2:
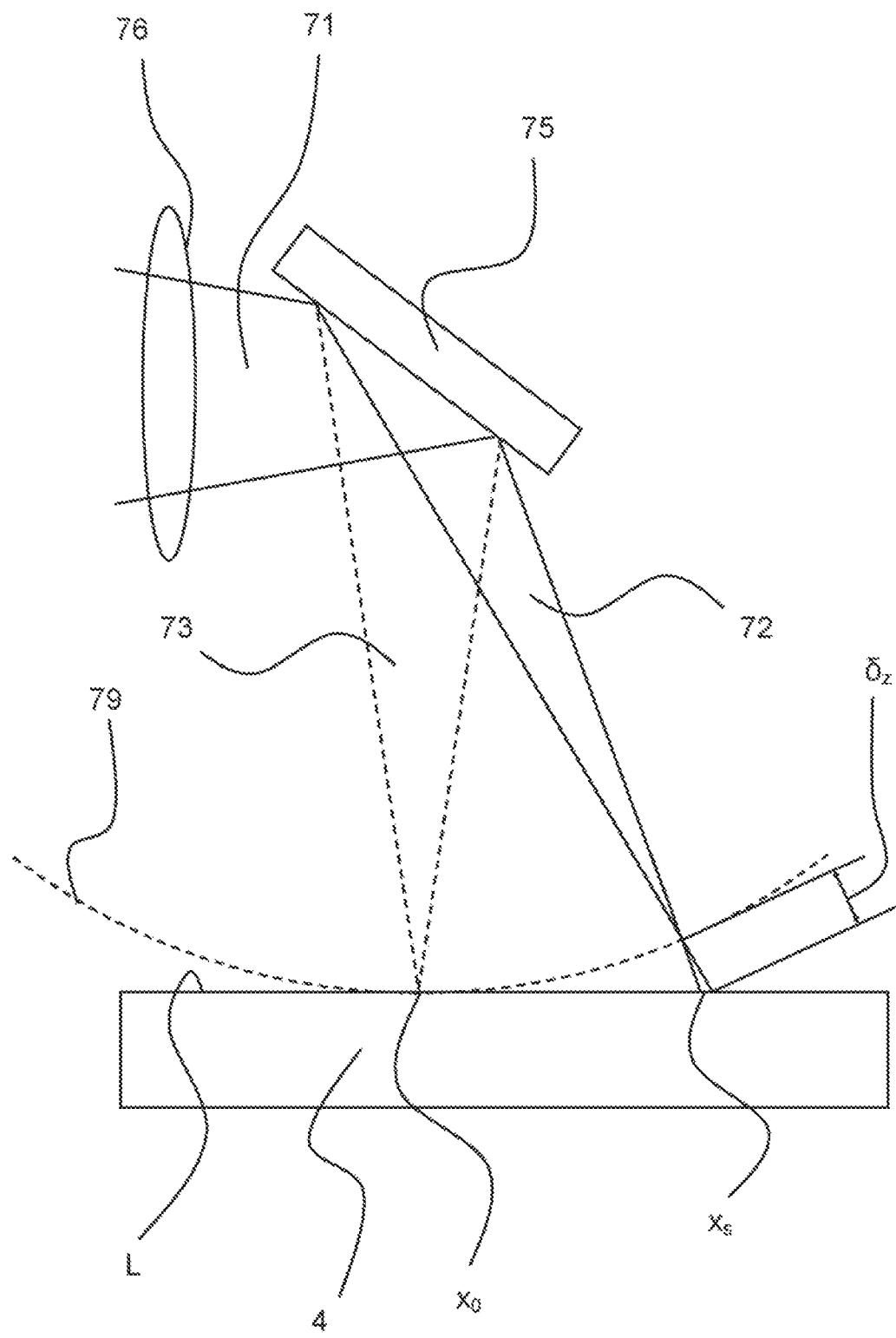
FIG. 2—shows a schematic overview of the electromagnetic radiation emitted by the solidifying device, via the rotatable deflector unit, onto the bath of material.

FIG. 2 shows a schematic detail of the laser beam 71, the rotatable optical element 75, and the radiation directed towards the surface L of the layer of material 4. Here, rays 73 and 72 show the radiation for different angular positions of the rotatable optical element 75. Due to the fact that a rotatable optical element 75 is used, a generally curved focal plane 79 is obtained. The build plate 51 (and the layer L of material 4) is a planar surface, and thus for a given position $x_s$ there will be a focus offset $\delta z$ along the optical axis. Hence, the geometrical set up of the solidifying device 7, the deflector unit 74, and the build plate 51 on the support 5 leads to a general focus offset, that may be compensated for by a so called general focus setting, which adjusts the focus based on a given x-position. The general focus settings may be incorporated into a look-up table, and may be used by the device to change focus depending on the position on the layer of material. This general focus setting is referred to as the '0'-setting for any given position. It will be apparent to those skilled in the art, that the actual focus setting of these '0'-setting may differ for different locations on the build plate, as it is the result of the geometrical set up.

Due to for instance, heating up of optical elements 76 by absorption of laser light, the focus characteristics can change. In particular, thermal expansion and change of refractive index with temperature are among the driving influences. These changes in focus, as a result of focus drift, causes variation in product quality. To further improve the focus, in particular to compensate for so called focus drift due to changes in temperature, a focus correction lens and focus correction unit according to the invention may be applied. Two possible embodiments thereof are shown in FIG. 3 and FIG. 4.

Figure 3:
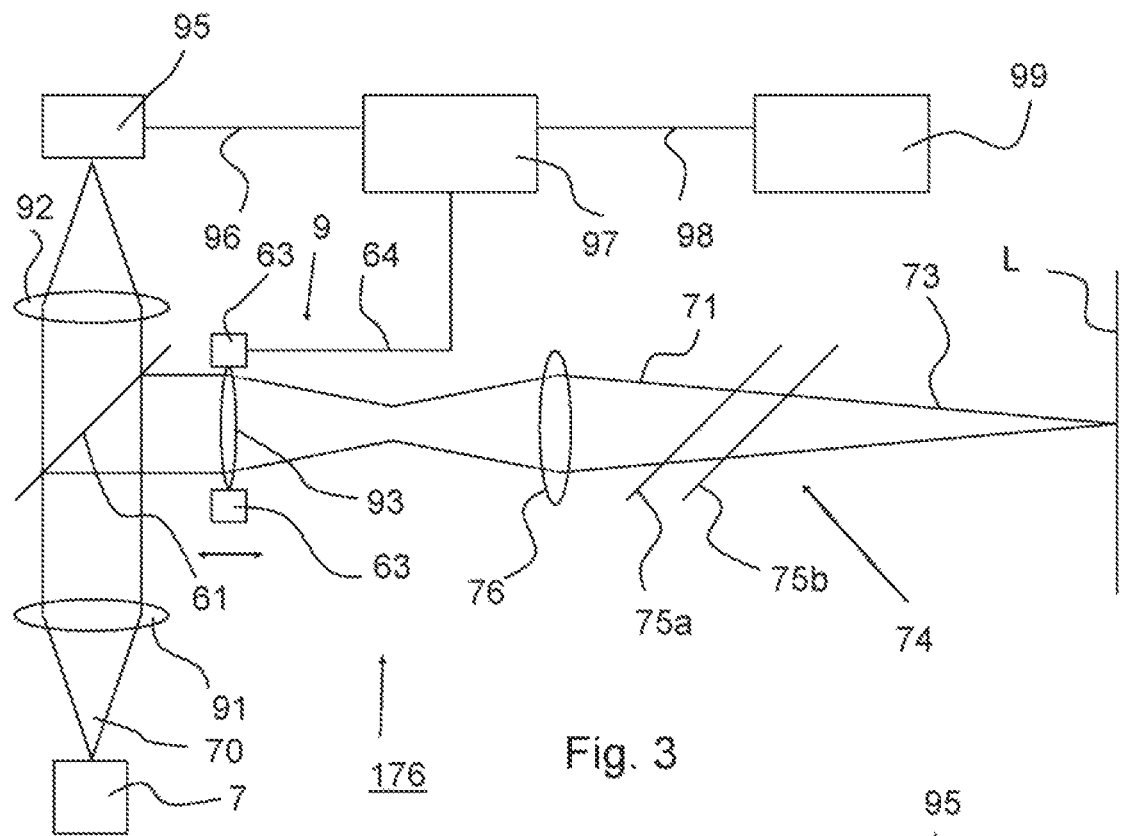
FIG. 3—schematically shows an overview of an optical control device according to a first embodiment of the invention.
Figure 4:
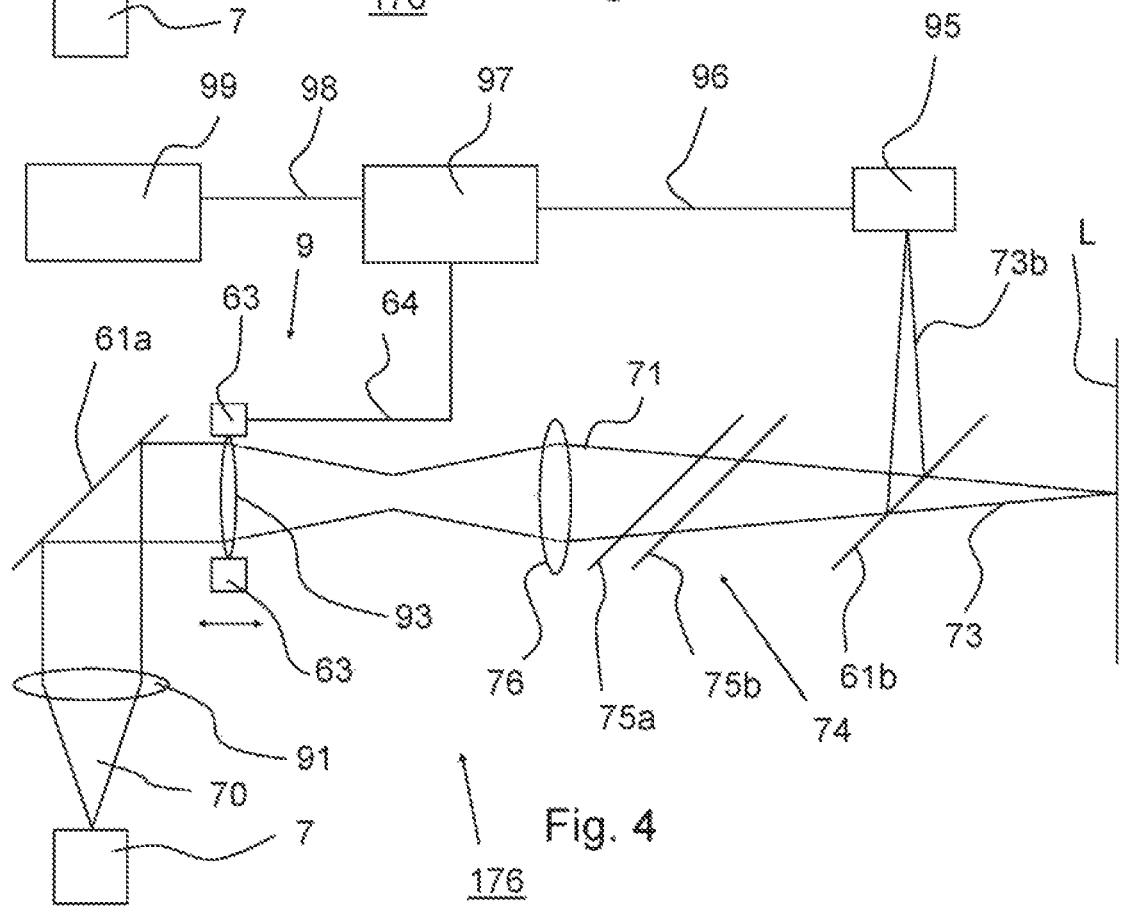
FIG. 4—schematically shows an overview of an optical control device according to a second embodiment of the invention.

FIG. 3 shows a first embodiment of a focus drift control device 9 according to the invention. FIG. 3 shows the solidifying device 7, emitting a beam 70, 71, 73 of electromagnetic radiation, onto the surface level L of the bath of material. A focus unit 176 is used to ensure correct focus of the beam. The focus unit 176 comprises a collimating lens 91, and a focus objective lens 76. Furthermore, the deflector unit 74 comprises two rotatable optical elements 75a, 75b that are used to direct the beam towards the desired xy-position.

It can be seen in FIG. 3 that there is provided a focus drift control device 9. This device 9 comprises a sensor element 95 arranged for detecting a measure for the accuracy of the focus of the electromagnetic radiation, a focus correction lens element 93 provided in the optical pathway of the electromagnetic radiation, and arranged to be movable (in housing 63) in the direction of at least an optical axis thereof; and a focus correction control unit 97, connected to said sensor element 95 via line 96 and to said focus correction element 93 via line 64, and arranged for moving said focus correction lens element 63 in response to a signal obtained by said sensor element 95. As can be seen in FIG. 3, lens element 63 is movably retained in the housing 63, such that the lens element may move left and/or right to change the focus of the beam 73 onto the surface L. The sensor element 95 may be arranged for measuring the intensity of the beam received. The focus correction lens element 93 may comprise a single positive or negative lens.

In the embodiment shown in FIG. 3, a beamsplitter element 61 is provided in the optical pathway of the electromagnetic radiation 60, and arranged for providing a beam of transmitted light (going upward in FIG. 3) and a beam of reflected light (going right in FIG. 3). The sensor element 95 is arranged downstream of the beamsplitter element 61, and is arranged to receive said beam of transmitted light. This beamsplitter element may be a plane surface beamsplitter, in an embodiment. The focus correction lens element 93 is arranged downstream of the beamsplitter element 61 and is arranged in the optical path of the beam of reflected light. The embodiment shown in FIG. 3 may be very compact, as the focus correction lens 93 is arranged in between said beamsplitter element 61 and said focus unit 76.

Additionally, the focus correction control unit 97 is arranged for receiving system information 99 and/or system data 99 of said apparatus, and is arranged for moving said focus correction lens element 93 in response to said system information 99 and/or said system data 99 of said apparatus. Said system information may for example be temperature information of the apparatus, or may contain operating parameters.

FIG. 4 shows an alternative embodiment of the device 9 shown in FIG. 3, in which some modifications with respect to placement of the sensor element 95 have been made. For reasons of conciseness it will be focused on the main differences. Same or similar components are indicated with the same reference sign. In FIG. 4 it can be seen that the beam splitter element 61b is provided more downstream in the optical path. The beam splitter element 61b is provided downstream of the deflector unit 74. This way, changes in temperature affecting the deflector unit 74, the optical element 76, and all further upstream components may be sensed by the sensor element 95, allowing compensation for these effects. In FIG. 4 a mirror 61a is used to deflect the beam from the solidifying device, although it is conceivable of course that the mirror 61a is eliminated completely, and the solidifying device 7 and collimating lens 91 are placed in line.

The focus correction lens 93 is still provided upstream of the optical element 76, but now that the sensor element 95 is provided downstream of the focus correction lens 93, a positive feedback control loop is possible, which is something that is difficult to achieve with the setup of FIG. 3. It is of course conceivable that the sensor element 95 is placed in a different part of the optical beam path, and that the focus correction lens element 93 is positioned in another part of the optical beam path. It is additionally, or alternatively conceivable that the sensor unit 81 of the calibration unit 8 (see FIG. 1) is used for detecting a measure for the accuracy of the focus of the electromagnetic radiation. Such a sensor unit 81 may be an imaging unit, such as a camera.

Figure 5:
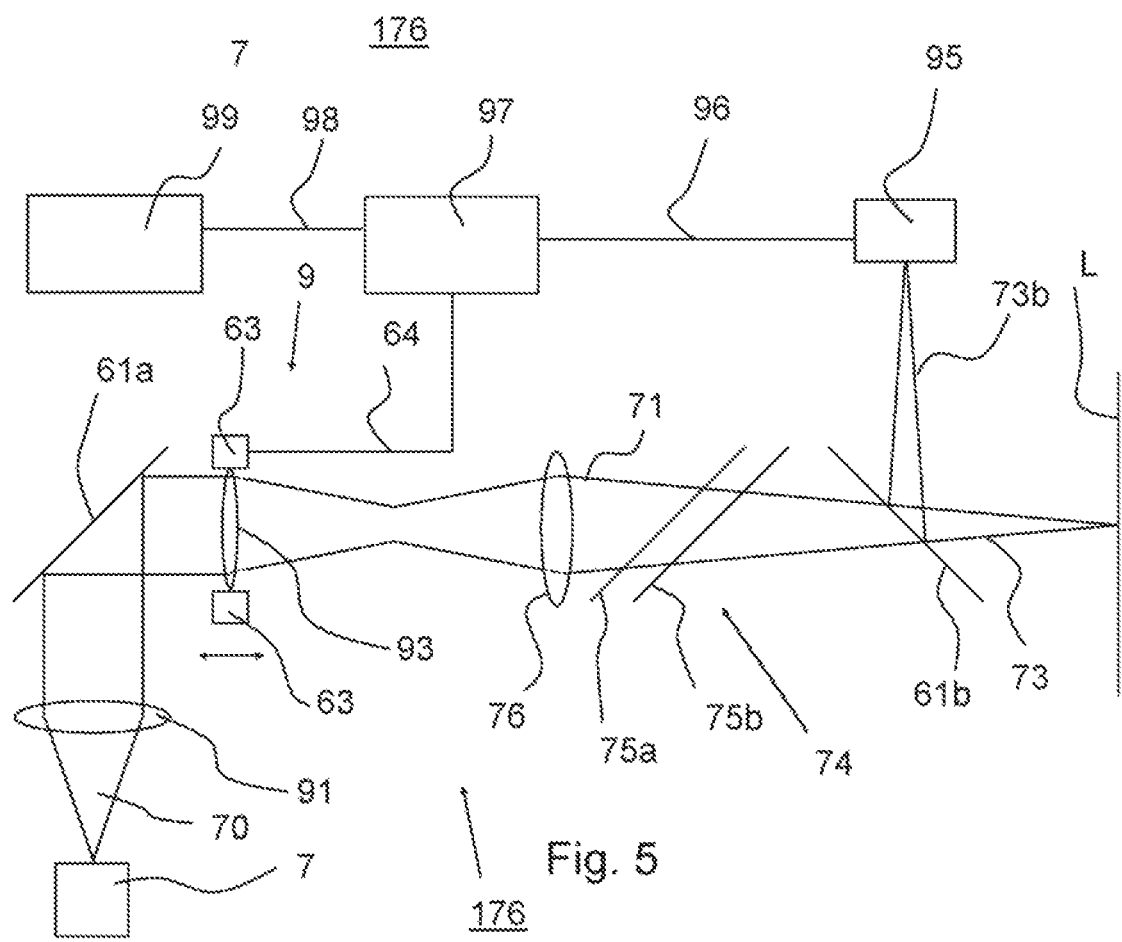
FIG. 5—shows an alternative embodiment to the set up of FIG. 4.

FIG. 5 shows an alternative embodiment to the set up of FIG. 4, wherein the sensor element is positioned downstream of the surface level L. Thus in effect, light on the surface level L is reflected backwards to the beam splitter element 61b and then passed onto the sensor element 95. This gives a possibility for a positive feedback control loop, such that the focus at the surface level L may be accurately controlled.

With the device and apparatus as described with respect to the figures, focus correction may be performed as follows. First, a beam 70, 71, 73 of electromagnetic radiation is provided, and said beam of electromagnetic radiation is focused on said surface level L of the bath of material 4 by using a focus unit 76 provided in an optical path of the electromagnetic radiation. Then a measure for the accuracy of the focus of the electromagnetic radiation is detected, using the sensor element 95. To correct the focus, the focus correction lens element 93 is moved in response to the detected measure for the accuracy of the focus of the electromagnetic radiation for correcting the focus. With this, focus of the beam is improved. The method may use the apparatus as described herein.

The invention claimed is:

1. An apparatus for producing an object by additive manufacturing, comprising:
    a process chamber for receiving a bath of material configured to be solidified by exposure to electromagnetic radiation;
    a support for positioning the object in relation to a surface level of the bath of material;
    a solidifying device for solidifying a selective layer-part of the material on the surface level by electromagnetic radiation; and
    an optical control device having a focus unit provided in an optical pathway of the electromagnetic radiation of the solidifying device, and configured for controlling at least the focus of the electromagnetic radiation emitted by the solidifying device on the surface level;
    wherein the optical control device comprises:
        a sensor element configured for detecting a measure for the accuracy of the focus of the electromagnetic radiation;
        a focus correction lens element provided in the optical pathway of the electromagnetic radiation, and configured to be movable in the direction of at least an optical axis thereof;
        a focus correction control unit, connected to the sensor element and to the focus correction element, and configured for moving the focus correction lens element in response to a signal obtained by the sensor element; and
        a beamsplitter element provided in the optical pathway of the electromagnetic radiation configured to split a beam of light originating from the solidifying device into a beam of transmitted light and a beam of reflected light;
        wherein the sensor element is positioned upstream of the surface level and downstream of the beamsplitter element.

2. The apparatus according to claim 1, wherein the sensor element is configured to receive the beam of transmitted light.

3. The apparatus according to claim 1, wherein the beamsplitter element is a plane surface beamsplitter.

4. The apparatus according to claim 1, wherein the focus correction lens element is positioned downstream of the beamsplitter element.

5. The apparatus according to claim 2, wherein the focus correction lens element is positioned in the optical path of the beam of reflected light.

6. The apparatus according to claim 5, wherein the focus correction lens element is positioned between the beamsplitter element and the focus unit.

7. The apparatus according to claim 1, wherein the focus correction control unit is configured for receiving system information and/or system data of the apparatus, and is configured for moving the focus correction lens element in response to the system information and/or the system data of the apparatus.

8. The apparatus according to claim 1, wherein the focus correction lens element comprises a positive or negative lens.

9. The apparatus according to claim 1, wherein the optical control device comprises a positive lens element positioned upstream of the sensor element.

10. The apparatus according to claim 1, wherein the focus correction lens element is positioned upstream of the sensor element.

11. The apparatus according to claim 1, wherein the focus correction lens element is positioned downstream of the sensor element.

* * * * *